United States Patent Office 2,788,348
Patented Apr. 9, 1957

2,788,348

DIAZOTIZATION OF 3-AMINO-4,5-BIS-(AMINO-METHYL)-2-METHYL PYRIDINE TRIHYDROCHLORIDE WITH BARIUM NITRITE

Fred Bernard Dorf, Plainfield, Alan P. Bentz, Bound Brook, and John E. Gordon, Middlesex, N. J., assignors to American Cyanamid Company, New York, N. Y., a corporation of Maine No Drawing. Application December 1, 1955,
Serial No. 550,460

4 Claims. (Cl. 260—297.5)

This invention relates to an improved process for the preparation of 3-hydroxy-4,5-bis(hydroxymethyl)-2-methylpyridine and its addition salts, the hydrochloride being commonly referred to as pyridoxine, and more particularly, to an improved process involving the conversion of 3-amino-4,5-bis-(aminomethyl)-2-methylpyridine to the corresponding trihydroxy compound by diazotization with barium nitrite.

Pyridoxine, which is sometimes known as vitamin $B_6$, is of importance in the therapy of vitamin deficiency and in the formulation of dietary supplements. As is customary in the case of a pharmaceutical, very high purity is necessary, and pyridoxine is no exception. The raw materials used are fairly costly and, therefore, high yields as well as high purity are of major economic importance.

In the past, pyridoxine has been prepared from 3-amino-4,5-bis-(aminomethyl)-2-methylpyridine, which for convenience will be referred to in the remainder of the specification by the shorter term used in the art as the "triamine compound," by diazotizing and heating the triamine compound to replace the amino groups originally present by hydroxy groups. Diazotization was effected in the usual manner with sodium nitrite and mineral acid. It is generally customary to use elevated temperatures because it is desired to decompose the diazonium compounds formed by converting into the hydroxy compounds. After the pyridoxine is produced, the solution is normally treated with activated carbon and clarified and the clear solution is then evaporated to remove the water, yielding a cake containing pyridoxine mixed with about three times its weight of sodium chloride. It is then necessary to separate the pyridoxine from the sodium chloride by extraction in an organic solvent, for which hot ethanol has been proposed. Pyridoxine hydrochloride thus obtained may then be purified further by aqueous recrystallization.

The method employed in the prior art has a number of disadvantages, especially for practical use on a commercial scale. In the first place, the pyridoxine is obtained as a precipitate contaminated by several times its weight of inorganic salt. The hot alcohol extraction, which was made necessary by the fact that it is not feasible to separate pyridoxine from salt by ordinary aqueous treatments, adds greatly to the time and equipment; and the extra labor results in a considerable cost increase. There is also a serious loss in yield. Corrosion, pitting and abrasion wear of the metal equipment is a further drawback.

Organic nitrites, such as butyl nitrite or amyl nitrite, which are sometimes used in diazotizing other materials were first tried in an attempt to eliminate inorganic salts. On a plant scale this proved to be impractical because of the high cost of the materials, their instability and the operating hazards due to toxicity and inflammability.

According to the present invention, the triamine compound is diazotized in acid solution by the use of barium nitrite and the barium then removed in the form of its sulfate. This is an all-aqueous process, it is cheap, and the yields obtained are superior to those which were possible when hot alcohol extraction was used to separate pyridoxine from sodium chloride. The markedly superior overall yields are made up of higher conversion in the diazotization step and elimination of the serious loss in the former alcohol extraction. Also, the pyridoxine obtained is of very high purity which is usually sufficiently high so that a single recrystallization results in a product of more than 99% purity. The barium is removed from the reaction mixture in the form of a sulfate, preferably by carrying out the diazotization with sulfuric acid as the inorganic acid. A crude product of 88% or more purity is obtained instead of one having a purity of approximately 25% and there is a material increase in yield which results in marked savings.

Although dealing with a process for preparing a pharmaceutical where purity is of the utmost importance, it has been found that the purity of the barium nitrite used is in no sense critical. It is, of course, possible to use barium nitrite in chemically pure state, but the same results are obtained with crude barium nitrite obtained by passing the tail gases from nitric acid manufacture into suspension of barium hydroxide or a solution of barium chloride. Despite the crude product used, the resulting pyridoxine is of the same high purity, and further important savings are then made possible.

The preferred modification of the present invention uses sulfuric acid as the mineral acid in the diazotization. It is possible to use hydrochloric acid or other suitable mineral acid and then add sulfuric acid at the end until barium sulfate is precipitated. However, this is less preferable, although operative, because when the diazotization is effected in a reaction mixture containing sulfuric acid as the mineral acid, barium sulfate precipitates in larger crystals on slow cooling, thus permitting a much more rapid filtration. A further operating advantage lies in the fact that, when sulfuric acid is used throughout as the only mineral acid, corrosion is reduced by a factor of at least ten, and it is possible to use equipment of commercially available metal alloys. Abrasive wear is also very greatly reduced.

The improved conversion with sulfuric acid and barium nitrite is all the more surprising because when sulfuric acid is used with sodium nitrite, conversions are much poorer instead of better. Another surprising result obtained with sulfuric acid alone is that only the hydrochloride (pyridoxine) is produced, even though the only chloride ion is that from the triamine compound and there is a large excess of sulfate ion present in the reaction mixture.

The amount of barium nitrite used in the reaction is of importance, although the grade of nitrite is not critical. For convenience, a solution of barium nitrite in water is employed which is added to an aqueous acidic solution of the triamine hydrochloride. The best range is from 2.9 to 3.5 mols of barium nitrite per mol of triamine compound, and this is a preferred embodiment.

In the process of the present invention, temperatures of the order of 90° C., for example from 88–92° C., give excellent results. Somewhat lower temperatures, down to 80° C., can be used but at some loss in yield. Preferably, the triamine solution is maintained at the specified temperature during the addition of the barium nitrite solution with thorough agitation, as in a conventional diazotization procedure. After all of the barium nitrite is added, the mixture is maintained at the same high temperature for an additional period until diazotization and replacement of the amino groups by hydroxyl groups is complete. If sulfuric acid is used as the mineral acid, the barium sulfate which is precipitated is removed directly by filtration. If another acid such as hydrochloric acid is used during the diazotization, the addition of sulfuric acid sufficient to precipitate the barium as a sulfate follows. Normally, in such a case a very slight excess of sulfuric acid is employed. Good filtration techniques are followed which may include the addition of activated carbon and filter aids.

After removal of the barium sulfate, the pyridoxine is isolated from the aqueous solution by any suitable means. A preferred method involves distilling off the water at low temperature, preferably in the presence of a small amount of higher-boiling inert solvent such as the ethyl ether of diethylene glycol in order to give a still-heel slurry which may be readily filtered.

While it is preferable to maintain the temperature around 90° C., for example 88–92° C., for the reaction, the invention is not strictly limited thereto and temperatures as low as 85° C. up to reflux temperatures, which will normally be a degree or two above 100° C., may be employed. The lower temperature ranges are less satisfactory, as the reaction time becomes longer and there is some loss in yield.

A preferred method involves distilling off the water at low temperature preferably in the presence of a small amount of high-boiling inert liquid of the class of monoalkyl ethers of diethylene glycol, such as methyl, ethyl, propyl and butyl ethers. This results in a still-heel slurry which may be readily filtered. The ethyl ether of diethylene glycol known as "Carbitol" is particularly preferred for this purpose.

The invention will be illustrated further in the specific examples which follow, the parts being by weight unless otherwise specified.

*Example 1*

Ten parts of the triamine in the form of its trihydrochloride are dissolved in 525 parts of water, 11.5 parts of concentrated sulfuric acid added, and the mixture heated to 88–92° C. A solution of 29.5 parts of barium nitrite in 61 parts of water is added to the mixture gradually with continuous stirring while maintaining the temperature. After the addition is complete, the temperature is maintained until diazotization is substantially complete and replacement of the amino groups by hydroxyl has taken place.

To the hot solution obtained above there is added 3.9 parts of a filter aid and 0.6 part of activated carbon and the mixture cooled to 25° C. or somewhat below. In order to assure completeness of barium precipitation, a very slight excess of sulfate ion must be maintained and the reaction mixture is tested for such excess, a small amount of sulfuric acid being added if necessary. The precipitate is then filtered off and washed with 77 parts of water. Twenty-one parts of the ethyl ether of diethylene glycol is then added to the filtrate and the water is removed by vacuum distillation. A slurry is obtained which is filtered and the solid washed with the diethylene glycol ether and acetone. A yield of approximately 70% of high quality pyridoxine is obtained which is recrystallized from water and is then of suitable pharmaceutical purity.

*Example 2*

The procedure of Example 1 is followed, except that the diazotization is effected in the presence of a mixture of 4.6 parts of concentrated hydrochloric acid and 11.5 parts of concentrated sulfuric acid. Similar results are obtained with a slightly lowered yield.

*Example 3*

Ten parts of the triamine trihydrochloride is added to 488 parts of water. 4.7 parts of concentrated hydrochloric acid is added and the solution heated to 88–92° C. The reaction mixture is thoroughly stirred and the following two solutions are added simultaneously but gradually:

(a) 31.4 parts of 5 N hydrochloric acid;
(b) A solution of 28.5 parts of barium nitrite monohydrate dissolved in 76.2 parts of water The temperature is maintained until reaction is complete. Dilute sulfuric acid is then added until the barium is completely precipitated as barium sulfate. Thereupon 3.85 parts of a filter aid, 0.6 part of activated carbon are added and the product is isolated in accordance with Example 1.

When the amount of barium nitrite was varied, yields dropped. Thus a 10% excess dropped the yield from above 63% to about 53%, whereas when only 80% of the barium nitrite is used, the yield drops still further.

We claim:

1. A process for the preparation of pyridoxine which comprises reacting barium nitrite with 3-amino-4,5-bis-(aminomethyl)-2-methylpyridine in the presence of sulfuric acid at a temperature between 80° C. and reflux, removing the barium as barium sulfate and isolating the pyridoxine.

2. A process according to claim 1 in which the temperature is 88–92° C.

3. A process according to claim 1 in which the barium sulfate is filtered off and the aqueous filtrate is distilled at low temperature in the presence of a small amount of an ether of diethylene glycol until a slurry of the pyridoxine is produced and the pyridoxine is then isolated by filtration.

4. A process according to claim 3 in which the ether of the diethylene glycol is the ethyl ether.

References Cited in the file of this patent

UNITED STATES PATENTS

| | | |
|---|---|---|
| 2,422,622 | Harris | June 17, 1947 |
| 2,483,137 | Harris | Sept. 27, 1949 |

OTHER REFERENCES

Witt et al.: Ber. Deut. Chem., vol. 36, pp. 4384–9 (1903).